(12) United States Patent
Kojima

(10) Patent No.: US 8,212,415 B2
(45) Date of Patent: Jul. 3, 2012

(54) NONCONTACT ELECTRIC POWER TRANSMISSION SYSTEM

(75) Inventor: Hideki Kojima, Tsurugashima (JP)

(73) Assignee: Toko Inc., Saitama (JP)

( * ) Notice: Subject to any disclaimer, the term of this patent is extended or adjusted under 35 U.S.C. 154(b) by 262 days.

(21) Appl. No.: 12/709,326

(22) Filed: Feb. 19, 2010

(65) Prior Publication Data
US 2010/0219696 A1 Sep. 2, 2010

(30) Foreign Application Priority Data

Feb. 27, 2009 (JP) ................. 2009-045477

(51) Int. Cl.
*H01F 38/00* (2006.01)
*H01F 37/00* (2006.01)
(52) U.S. Cl. ........................................ 307/104
(58) Field of Classification Search .................. 307/104
See application file for complete search history.

(56) References Cited

U.S. PATENT DOCUMENTS

| | | | |
|---|---|---|---|
| 5,654,621 A | 8/1997 | Seelig | |
| 6,160,374 A | 12/2000 | Hayes et al. | |
| 7,639,095 B2 * | 12/2009 | Ocket et al. | 331/151 |
| 2009/0079271 A1 * | 3/2009 | Jin | 307/104 |

FOREIGN PATENT DOCUMENTS

| | | |
|---|---|---|
| JP | 8-502640 | 3/1996 |
| JP | 2001-103685 | 4/2001 |
| JP | 2008-263710 | 10/2008 |

* cited by examiner

*Primary Examiner* — Hal Kaplan
(74) *Attorney, Agent, or Firm* — Cozen O'Connor

(57) ABSTRACT

Disclosed is a noncontact electric power transmission system having a power transmitter circuit section 10 and a power receiver circuit section 30 which are adapted to be coupled to transmit electric power from a transmitter coil Lp provided in the power transmitter circuit section 10 to a receiver coil Ls provided in the power receiver circuit section 30, in a noncontact manner by means of electromagnetic induction. The noncontact electric power transmission system comprises: a separately-excited or self-excited switching circuit 2 provided in the power transmitter circuit section 10; a control IC 3 operable to drive the switching circuit 2; an LC series resonant circuit including a capacitor Cp connected in series to the transmitter coil Lp or an LC parallel resonant circuit including a capacitor Cp connected in parallel to the transmitter coil Lp; and an LC parallel resonant circuit including a capacitor Cs connected in parallel to the receiver coil Ls, wherein an oscillating frequency (Fosc) of the control IC 3, a resonant frequency (Fpr) of the LC series resonant circuit or the LC parallel resonant circuit in the power transmitter circuit section 10, and a resonant frequency (Fsr) of the LC parallel resonant circuit in the power receiver circuit section 30, have the following relationship: Fpr<Fosc<Fsr.

2 Claims, 3 Drawing Sheets

PRIOR ART FIG. 1
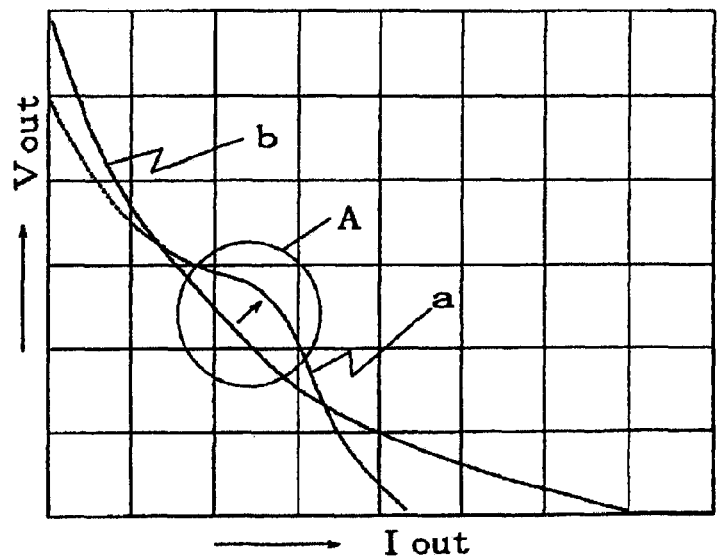
FIG. 2
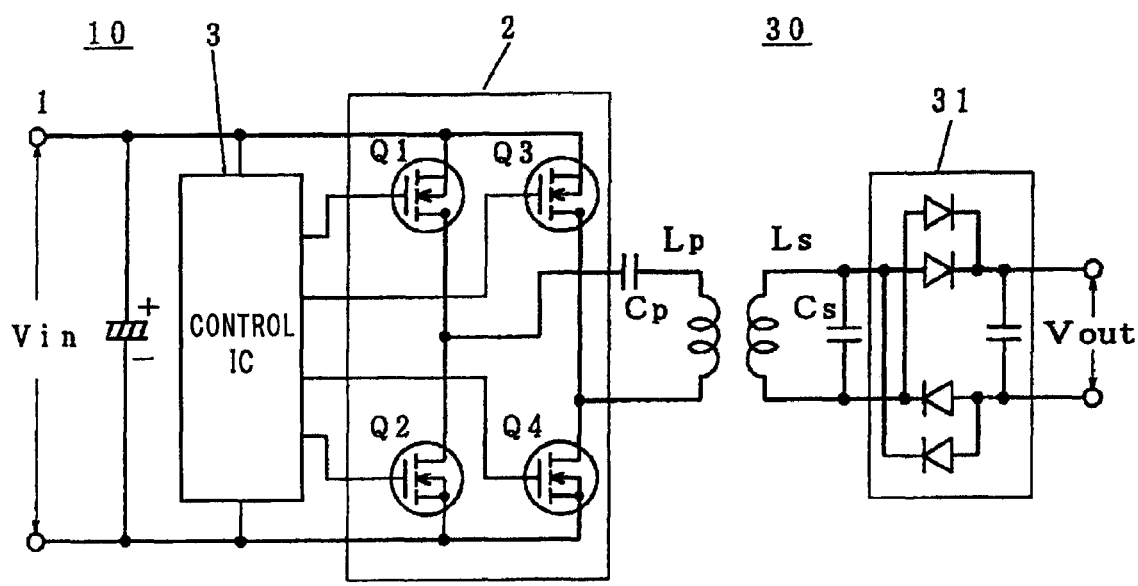

$100 \times (Fosc - Fpr) / Fosc$, AND $100 \times (Fsr - Fosc) / Fosc$
WHERE $(Fosc - Fpr) \fallingdotseq (Fsr - Fosc)$ WHERE $[100 \times (Fosc - Fpr) / Fosc] + [100 \times (Fsr - Fosc) / Fosc] \fallingdotseq 50\%$

NONCONTACT ELECTRIC POWER TRANSMISSION SYSTEM

BACKGROUND OF THE INVENTION

1. Field of the Invention

The present invention relates to a noncontact electric power transmission system, and more specifically to a design technique of, in a noncontact electric power transmission system comprising a power transmitter circuit section and a power receiver circuit section, clarifying a relationship between respective ones of a switching oscillating frequency in the power transmitter circuit section, an LC resonant frequency in the power transmitter circuit section, and an LC resonant frequency in the power receiver circuit section, to facilitate obtaining required characteristics.

2. Description of the Related Art

Heretofore, a resonant full-bridge system has been generally used in a type of noncontact electric power transmission system designed to achieve high efficiency in a contactless manner under a low DC input power.

In the resonant full-bridge system, a switching circuit is driven by an oscillating frequency of a control IC or the like, i.e., a switching frequency of the switching circuit is determined by the oscillating frequency. In terms of design parameters, there are the oscillating frequency of the control IC provided in a power transmitter circuit section of the system (power transmitter-side oscillating frequency), a resonant frequency of an LC series resonant circuit or an LC parallel resonant circuit provided in the power transmitter circuit section (power transmitter-side resonant frequency), and a resonant frequency of an LC parallel resonant circuit provided in a power receiver circuit section of the system (power receiver-side resonant frequency). JP 2001-103685A and JP 08-502640A disclose that a maximum electric power is transmitted at a resonance point when the power transmitter-side resonant frequency is set to become equal to the power receiver-side resonant frequency. As seen in these documents, it has been considered that optimum characteristics can be obtained when the three frequencies (the oscillating frequency, the power transmitter-side resonant frequency and the power receiver-side resonant frequency) have approximately the same values.

An output characteristic curve (a) illustrated in FIG. 1 represents an output voltage-output current characteristic to be obtained when the three frequencies (the oscillating frequency, the power transmitter-side resonant frequency and the power receiver-side resonant frequency) are set to become equal to each other. An output characteristic curve (b) illustrated in FIG. 1 represents an output voltage-output current characteristic of a noncontact electric power transmission system where a resonant capacitor is eliminated from each of the LC series or parallel resonant circuit in the power transmitter circuit section, and the LC parallel resonant circuit in the power receiver circuit section.

As seen in FIG. 1, if the oscillating frequency, the power transmitter-side resonant frequency and the power receiver-side resonant frequency are set to become equal to each other, an output voltage is apt to become higher at a resonance point A, even at the same current. This characteristic cannot be used without modification, because it is unfit for an output necessary as a commonly-used power supply. Moreover, if one of the three frequencies deviates from the resonance point, the output voltage will sharply drop and become unstable, which makes it impossible to obtain a stable output characteristic. Further, in cases where it is attempted to obtain a required output characteristic in an existing system, it is necessary to selectively set a value of the power transmitter-side oscillating frequency, a parameter value determining the power transmitter-side resonant frequency (i.e., an inductance value of a transmitter coil and a capacitance value of a capacitor in the power transmitter circuit section), and a parameter value determining the power receiver-side resonant frequency (i.e., an inductance value of a receiver coil and a capacitance value of a capacitor in the power receiver circuit section), on a case-by-case basis. In other words, it is necessary to adjust the power transmitter-side resonant frequency and the power receiver-side resonant frequency individually. If the two frequencies are adjusted in an imbalanced manner, transmission efficiency is likely to deteriorate. Furthermore, a design process becomes complicated and requires a lot of time.

SUMMARY OF THE INVENTION

In view of the above problems, it is an object of the present invention to specify a relationship between respective ones of a power transmitter-side oscillating frequency, a power transmitter-side resonant frequency and a power receiver-side resonant frequency in a noncontact electric power transmission system, to obtain optimum transmission efficiency and reduce a design time.

In order to achieve the above object, the present invention provides a noncontact electric power transmission system having a power transmitter circuit section and a power receiver circuit section which are adapted to be coupled to transmit electric power from a transmitter coil provided in the power transmitter circuit section to a receiver coil provided in the power receiver circuit section, in a noncontact manner by means of electromagnetic induction. The noncontact electric power transmission system comprises: a separately-excited or self-excited switching circuit provided in the power transmitter circuit section; a control IC operable to drive the switching circuit; an LC series resonant circuit including a capacitor connected in series to the transmitter coil or an LC parallel resonant circuit including a capacitor connected in parallel to the transmitter coil; and an LC parallel resonant circuit including a capacitor connected in parallel to the receiver coil, wherein an oscillating frequency (Fosc) of the control IC, a resonant frequency (Fpr) of the LC series resonant circuit or the LC parallel resonant circuit in the power transmitter circuit section, and a resonant frequency (Fsr) of the LC parallel resonant circuit in the power receiver circuit section, have the following relationship: Fpr<Fosc<Fsr.

Preferably, in the noncontact electric power transmission system of the present invention, a ratio of a difference obtained by subtracting the resonant frequency (Fpr) of the LC series resonant circuit or the LC parallel resonant circuit in the power transmitter circuit section from the oscillating frequency (Fosc) of the control IC, to the oscillating frequency (Fosc) of the control IC, is in the range of 15 to 35%, and a ratio of a difference obtained by subtracting the oscillating frequency (Fosc) of the control IC from the resonant frequency (Fsr) of the LC parallel resonant circuit in the power receiver circuit section, to the oscillating frequency (Fosc) of the control IC, is in the range of 15 to 35%.

As above, in the present invention, a relationship between respective ones of the oscillating frequency (Fosc) of the control IC, the resonant frequency (Fpr) of the LC series resonant circuit or the LC parallel resonant circuit in the power transmitter circuit section, and the resonant frequency (Fsr) of the LC parallel resonant circuit in the power receiver circuit section, is set as follows: Fpr<Fosc<Fsr. This makes it possible to obtain optimum transmission efficiency in the noncontact electric power transmission system, and reduce a design time therefor.

BRIEF DESCRIPTION OF THE DRAWINGS

FIG. 1 is a graph showing an output voltage-output current characteristic in a conventional noncontact electric power transmission system.

FIG. 2 is a diagram showing a noncontact electric power transmission system according to one embodiment of the present invention.

DESCRIPTION OF THE PREFERRED EMBODIMENTS

Figure 3:
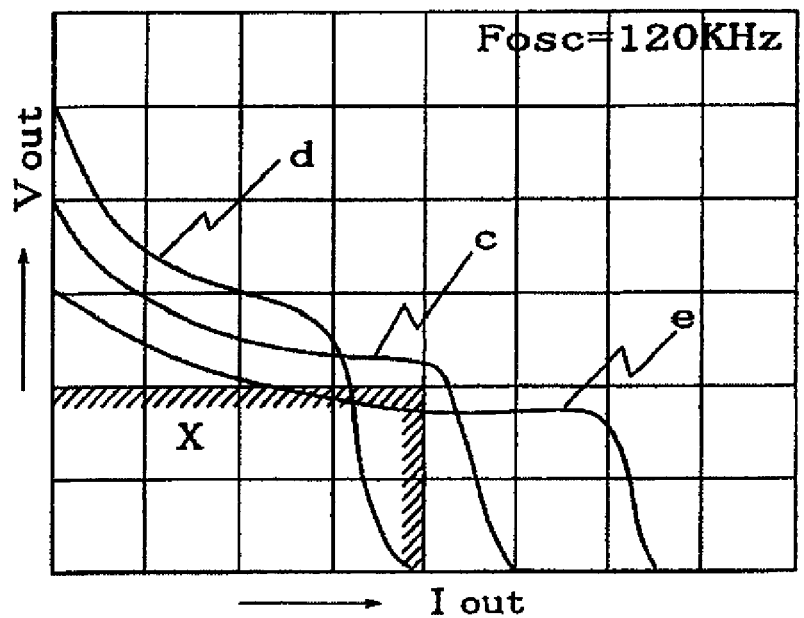
FIG. 3 is a graph showing an output voltage-output current characteristic in a test sample of the noncontact electric power transmission system according to the embodiment.

The present invention is directed to a noncontact electric power transmission system having a power transmitter circuit section and a power receiver circuit section which are adapted to be coupled to transmit electric power from a transmitter coil provided in the power transmitter circuit section to a receiver coil provided in the power receiver circuit section, in a noncontact manner by means of electromagnetic induction. The noncontact electric power transmission system comprises: a separately-excited or self-excited switching circuit provided in the power transmitter circuit section; a control IC operable to drive the switching circuit; an LC series resonant circuit including a capacitor connected in series to the transmitter coil or an LC parallel resonant circuit including a capacitor connected in parallel to the transmitter coil; and an LC parallel resonant circuit including a capacitor connected in parallel to the receiver coil, wherein an oscillating frequency (Fosc) of the control IC, a resonant frequency (Fpr) of the LC series resonant circuit or the LC parallel resonant circuit in the power transmitter circuit section, and a resonant frequency (Fsr) of the LC parallel resonant circuit in the power-receiver circuit section, have the following relationship: Fpr<Fosc<Fsr.

In an preferred embodiment of the present invention, a ratio of a difference obtained by subtracting the resonant frequency (Fpr) of the LC series resonant circuit or the LC parallel resonant circuit in the power transmitter circuit section from the oscillating frequency (Fosc) of the control IC to the oscillating frequency (Fosc) of the control IC is in the range of 15 to 35%, and a ratio of a difference obtained by subtracting the oscillating frequency (Fosc) of the control IC from the resonant frequency (Fsr) of the LC parallel resonant circuit in the power receiver circuit section to the oscillating frequency (Fosc) of the control IC is in the range of 15 to 35%.

With reference to the drawings, the present invention will be more specifically described based on an embodiment thereof. FIG. 2 shows a noncontact electric power transmission system according to one embodiment of the present invention, wherein a full-bridge circuit is used as the separately-excited switching circuit.

As shown in FIG. 2, the noncontact electric power transmission system according to this embodiment comprises a power transmitter circuit section 10 and a power receiver circuit section 30. The power transmitter circuit section 10 includes a DC power supply 1 for supplying an input voltage, four switching elements Q1 to Q4 constituting a full-bridge circuit 2 serving as a switching circuit, a transmitter coil Lp, a resonant capacitor Cp forming a series resonant circuit in cooperation with the transmitter coil Lp, and a control IC 3 for switchingly controlling the full-bridge circuit 2. The power receiver circuit section 30 includes a receiver coil Ls for receiving electric power from the transmitter coil Lp in a noncontact manner by an action of electromagnetic induction, a resonant capacitor Cs forming a parallel resonant circuit in cooperation with the receiver coil Ls, and a rectifying/smoothing circuit 31.

As a test sample, a noncontact electric power transmission system was prepared in such a manner that the transmitter coil Lp and the resonant capacitor Cp in the power transmitter circuit section 10 are connected in series to each other to form a series resonant circuit, and the receiver coil Ls and the resonant capacitor Cs in the power receiver circuit section 30 are connected in parallel to each other to form a parallel resonant circuit. Further, a gap between the transmitter coil Lp in the power transmitter circuit section 10 and the receiver coil Ls in the power receiver circuit section 30 was set to a usual range of about 3 to 6 mm. In this system, the transmitter coil Lp and the resonant capacitor Cp in the power transmitter circuit section 10 may be connected in parallel to each other to form a parallel resonant circuit.

A switching frequency of the full-bridge circuit 2 in the power transmitter circuit section 10 is controlled by an oscillating frequency (Fosc) of the control IC 3. Given that an inductance value of the transmitter coil Lp is L1, and a capacitance value of the resonant capacitor Cp in the power transmitter circuit section is C1, a resonant frequency (Fpr) of the LC series resonant circuit in the power transmitter circuit section is expressed as follows:

$$Fpr=1/(2\pi\sqrt{(L1 \times C1)})$$

Further, given that an inductance value of the receiver coil Ls is L2, and a capacitance value of the resonant capacitor Cs in the power receiver circuit section is C2, a resonant frequency (Fsr) of the LC parallel resonant circuit in the power receiver circuit section is expressed as follows:

$$Fsr=1/(2\pi\sqrt{(L2 \times C2)})$$

Figure 4:
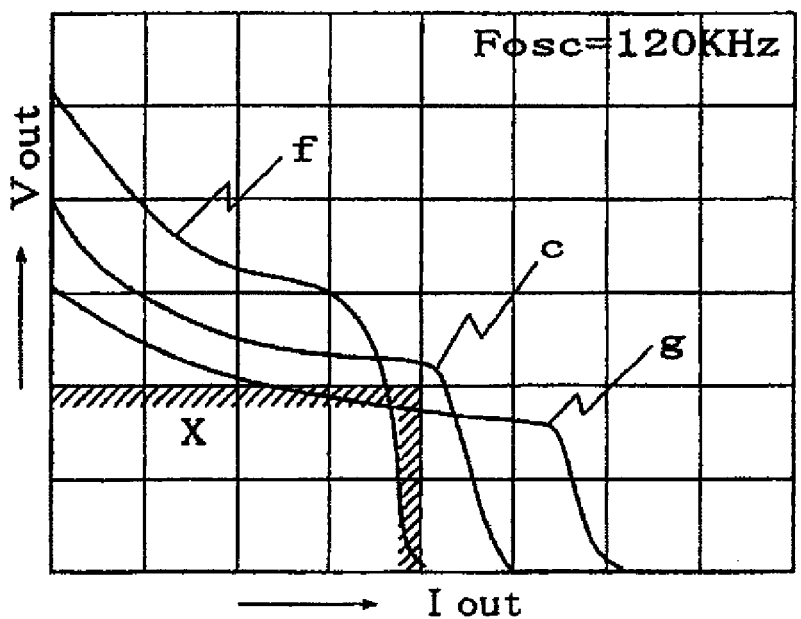
FIG. 4 is a graph showing an output voltage-output current characteristic in another test sample of the noncontact electric power transmission system according to the embodiment.

With reference to FIGS. 3 and 4, an example of a design technique for the noncontact electric power transmission system according to the above embodiment will be described based on a specific resonant frequency. FIGS. 3 and 4 show a plurality of output (output voltage-output current) characteristics obtained by changing the resonant frequency (Fpr) of the LC series resonant circuit in the power transmitter circuit section (power transmitter-side series resonant frequency (Fpr)), and the resonant frequency (Fsr) of the LC parallel resonant circuit in the power receiver circuit section (power receiver-side parallel resonant frequency (Fsr)), under a condition that the oscillating frequency (Fosc) of the control IC 3 is fixed at 120 kHz, wherein a hatched portion indicates an output characteristic X required for the noncontact electric power transmission system.

In FIG. 3, an output characteristic curve (c) represents an output voltage-output current characteristic to be obtained when the power transmitter-side series resonant frequency (Fpr) is set to be (Fosc−30 kHz)=90 kHz, and the power receiver-side parallel resonant frequency (Fsr) is set to be (Fosc+30 kHz)=150 kHz. The output characteristic curve (c) satisfies the required output characteristic X.

An output characteristic curve (d) represents an output voltage-output current characteristic to be obtained when the power transmitter-side series resonant frequency (Fpr) is set to be (Fosc−20 kHz)=100 kHz, and the power receiver-side parallel resonant frequency (Fsr) is set to be (Fosc+40 kHz)=160 kHz. The output characteristic curve (d) cannot satisfy the required output characteristic X. Specifically, in this case, the power transmitter-side series resonant frequency (Fpr) is set to a value greater than that for the required output characteristic X, by reducing a capacitance value of the resonant capacitor Cp in the power transmitter circuit section to increase a characteristic impedance (Zpr). Further, the power receiver-side parallel resonant frequency (Fsr) is also set to a value greater than that for the required output characteristic X, by reducing a capacitance value of the resonant capacitor Cs in the power-receiver circuit section to increase a characteristic impedance (Zsr). Thus, a voltage in the power transmitter circuit section is increased, and a current in the power receiver circuit section is reduced.

An output characteristic curve (e) represents an output voltage-output current characteristic to be obtained when the power transmitter-side series resonant frequency (Fpr) is set to be (Fosc−40 kHz)=80 kHz, and the power receiver-side parallel resonant frequency (Fsr) is set to be (Fosc+20 kHz)=140 kHz. The output characteristic curve (e) cannot satisfy the required output characteristic X. Specifically, in this case, the power transmitter-side series resonant frequency (Fpr) is set to a value less than that for the required output characteristic X, by increasing the capacitance value of the resonant capacitor Cp in the power transmitter circuit section to reduce the characteristic impedance (Zpr). Further, the power receiver-side parallel resonant frequency (Fsr) is also set to a value less than that for the required output characteristic X, by increasing the capacitance value of the resonant capacitor Cs in the power receiver circuit section to reduce the characteristic impedance (Zsr). Thus, the voltage in the power transmitter circuit section is reduced, and the current in the power receiver circuit section is increased.

Referring now to FIG. 4, it shows an output characteristic curve (c) of the optimum conditions illustrated in FIG. 3. As in FIG. 3, hatched portion in FIG. 4 shows the output characteristic X required by the noncontact electric power transmission system.

An output characteristic curve (f) represents an output voltage-output current characteristic to be obtained when the power transmitter-side series resonant frequency (Fpr) is set to be (Fosc−20 kHz)=100 kHz, and the power receiver-side parallel resonant frequency (Fsr) is set to be (Fosc+20 kHz)=140 kHz. The output characteristic curve (f) cannot satisfy the required output characteristic X. Specifically, in this case, the power transmitter-side series resonant frequency (Fpr) is set to a value greater than that for the required output characteristic X, by reducing the capacitance value of the resonant capacitor Cp in the power transmitter circuit section to increase the characteristic impedance (Zpr). Further, the power receiver-side parallel resonant frequency (Fsr) is set to a value less than that for the required output characteristic X, by increasing the capacitance value of the resonant capacitor Cs in the power receiver circuit section to reduce the characteristic impedance (Zsr). Thus, the voltage in the power transmitter circuit section is increased, and the current in the power receiver circuit section is reduced. However, the voltage in the power transmitter circuit section is relatively high under limited electric power, so that the current in the power receiver circuit section is not so effectively increased.

An output characteristic curve (g) represents an output voltage-output current characteristic to be obtained when the power transmitter-side series resonant frequency (Fpr) is set to be (Fosc−40 kHz)=80 kHz, and the power receiver-side parallel resonant frequency (Fsr) is set to be (Fosc+40 kHz)=160 kHz. The output characteristic curve (g) cannot satisfy the required output characteristic X. Specifically, in this case, the power transmitter-side series resonant frequency (Fpr) is set to a value less than that for the required output characteristic X, by increasing the capacitance value of the resonant capacitor Cp in the power transmitter circuit section to reduce the characteristic impedance (Zpr). Further, the power receiver-side parallel resonant frequency (Fsr) is set to a value greater than that for the required output characteristic X, by reducing the capacitance value of the resonant capacitor Cs in the power receiver circuit section to increase the characteristic impedance (Zsr). Thus, the voltage in the power transmitter circuit section is reduced, and the current in the power receiver circuit section is increased. However, the voltage in the power transmitter circuit section is relatively low under limited electric power, so that the current in the power receiver circuit section is not so effectively reduced.

In view of the above test result, it is considered that an optimum output characteristic can be obtained when the power transmitter-side series resonant frequency (Fpr) is set to a value equal to (100−25) % of the oscillating frequency (Fosc), and the power receiver-side parallel resonant frequency (Fsr) is set to a value equal to (100+25) % of the oscillating frequency (Fosc).

Figure 5:
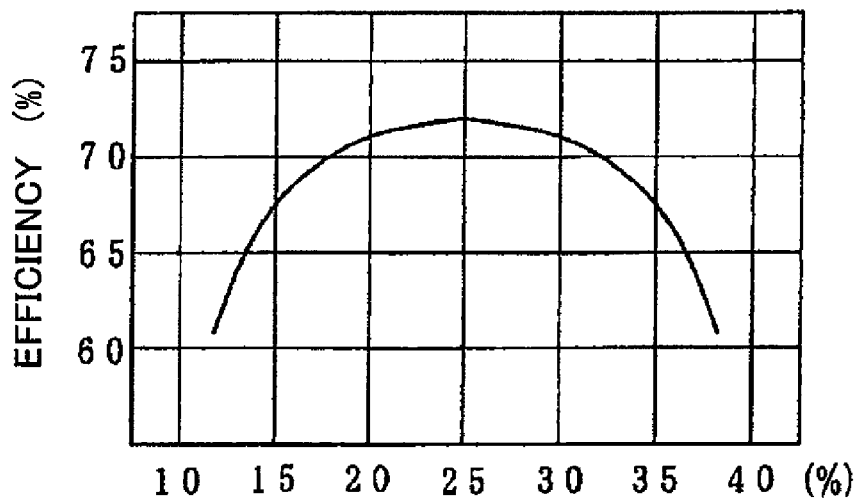
FIG. 5 is a graph showing an efficiency characteristic obtained by changing a ratio of a difference obtained by subtracting a power transmitter-side series resonant frequency (Fpr) from an oscillating frequency (Fosc), to the oscillating frequency (Fosc), and a ratio of a difference obtained by subtracting the oscillating frequency (Fosc) from a power receiver-side parallel resonant frequency (Fsr), to the oscillating frequency (Fosc), wherein Fosc−Fpr≈Fsr−Fosc.

FIG. 5 shows an efficiency characteristic obtained by changing a ratio of a difference obtained by subtracting the power transmitter-side series resonant frequency (Fpr) from the oscillating frequency (Fosc), to the oscillating frequency (Fosc) (i.e., 100×(Fosc−Fpr)/Fosc), and a ratio of a difference obtained by subtracting the oscillating frequency (Fosc) from the power receiver-side parallel resonant frequency (Fsr), to the oscillating frequency (Fosc) (i.e., 100×(Fsr−Fosc)/Fosc), wherein the oscillating frequency (Fosc), the power transmitter-side series resonant frequency (Fpr) and the power receiver-side parallel resonant frequency (Fsr) have the following relationship: Fosc−Fpr≈Fsr−Fosc.

As evidenced by FIG. 5, the efficiency is maximized when each of the ratio of the difference obtained by subtracting the power transmitter-side series resonant frequency (Fpr) from the oscillating frequency (Fosc) to the oscillating frequency (Fosc), and the ratio of the difference obtained by subtracting the oscillating frequency (Fosc) from the power receiver-side parallel resonant frequency (Fsr) to the oscillating frequency (Fosc), is set to 25%. Preferably, each of the ratio of the difference obtained by subtracting the power transmitter-side series resonant frequency (Fpr) from the oscillating frequency (Fosc) to the oscillating frequency (Fosc), and the ratio of the difference obtained by subtracting the oscillating frequency (Fosc) from the power receiver-side parallel resonant frequency (Fsr) to the oscillating frequency (Fosc), is set in the range of 15 to 35%. This makes it possible to obtain stable efficiency.

Figure 6:
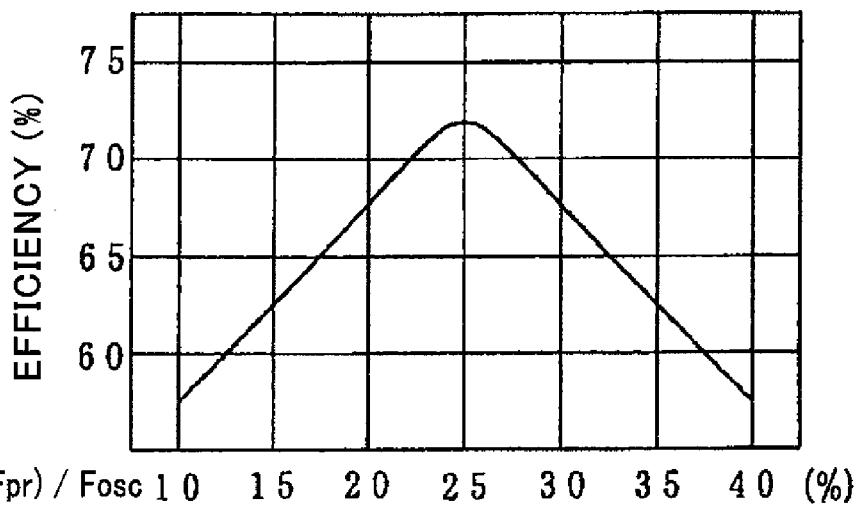
FIG. 6 is a graph showing an efficiency characteristic obtained by changing a ratio of a difference obtained by subtracting the power transmitter-side series resonant frequency (Fpr) from the oscillating frequency (Fosc), to the oscillating frequency (Fosc), and a ratio of a difference obtained by subtracting the oscillating frequency (Fosc) from the power receiver-side parallel resonant frequency (Fsr), to the oscillating frequency (Fosc), wherein [100×(Fosc−Fpr)/Fosc]+[100×(Fsr−Fosc)/Fosc]≈50%.

FIG. 6 shows an efficiency characteristic obtained by changing a ratio of a difference obtained by subtracting the power transmitter-side series resonant frequency (Fpr) from the oscillating frequency (Fosc), to the oscillating frequency (Fosc) (i.e., 100×(Fosc−Fpr)/Fosc), and a ratio of a difference obtained by subtracting the oscillating frequency (Fosc) from the power receiver-side parallel resonant frequency (Fsr), to the oscillating frequency (Fosc) (i.e., 100×(Fsr−Fosc)/Fosc), wherein the oscillating frequency (Fosc), the power transmitter-side series resonant frequency (Fpr) and the power receiver-side parallel resonant frequency (Fsr) have the following relationship: [100×(Fosc−Fpr)/Fosc]+[100×(Fsr−Fosc)/Fosc]≈50%.

As evidenced by FIG. 6, the efficiency is maximized when [100×(Fosc−Fpr)/Fosc]=[100×(Fsr−Fosc)/Fosc]=25%.

Thus, it is preferable that the ratio of the difference obtained by subtracting the power transmitter-side series resonant frequency (Fpr) from the oscillating frequency (Fosc) to the oscillating frequency (Fosc) is set in the range of 15 to 35%, and the ratio of the difference obtained by subtracting the oscillating frequency (Fosc) from the power receiver-side parallel resonant frequency (Fsr) to the oscillating frequency (Fosc) is set in the range of 15 to 35%. This makes it possible to obtain stable efficiency.

In the above embodiment, the LC series resonant circuit is used in the power transmitter circuit section 10. Alternatively, an LC parallel resonant circuit may be used. In the above embodiment, the full-bridge circuit 2 is used in the power transmitter circuit section 10. Alternatively, a half-bridge circuit or a push-pull circuit may be used. Further, as long as each of the ratio of the difference obtained by subtracting the power transmitter-side series resonant frequency (Fpr) from the oscillating frequency (Fosc) to the oscillating frequency (Fosc), and the ratio of the difference obtained by subtracting the oscillating frequency (Fosc) from the power receiver-side parallel resonant frequency (Fsr) to the oscillating frequency (Fosc), can be set in the range of 15 to 35%, a self-excited circuit, an RCC circuit, a Royer circuit or a collector tuning circuit (Hartley circuit) may also be used. In the above embodiment, the rectifying/smoothing circuit 31 in the power receiver circuit section 30 is illustrated as a bridge circuit. Alternatively, a half-wave rectifier circuit may be used.

What is claimed is:

1. A noncontact electric power transmission system having a power transmitter circuit section and a power receiver circuit section which are adapted to be coupled to transmit electric power from a transmitter coil provided in the power transmitter circuit section to a receiver coil provided in the power receiver circuit section, in a noncontact manner by means of electromagnetic induction, the noncontact electric power transmission system comprising: a separately-excited or self-excited switching circuit provided in the power transmitter circuit section; a control IC operable to drive the switching circuit; an LC series resonant circuit including a capacitor connected in series to the transmitter coil or an LC parallel resonant circuit including a capacitor connected in parallel to the transmitter coil; and an LC parallel resonant circuit including a capacitor connected in parallel to the receiver coil, wherein an oscillating frequency (Fosc) of the control IC, a resonant frequency (Fpr) of the LC series resonant circuit or the LC parallel resonant circuit in the power transmitter circuit section, and a resonant frequency (Fsr) of the LC parallel resonant circuit in the power receiver circuit section, have the following relationship: Fpr<Fosc<Fsr.

2. The noncontact electric power transmission system as defined in claim 1, wherein a ratio of a difference obtained by subtracting the resonant frequency (Fpr) of the LC series resonant circuit or the LC parallel resonant circuit in the power transmitter circuit section from the oscillating frequency (Fosc) of the control IC, to the oscillating frequency (Fosc) of the control IC, is in the range of 15 to 35%, and a ratio of a difference obtained by subtracting the oscillating frequency (Fosc) of the control IC from the resonant frequency (Fsr) of the LC parallel resonant circuit in the power receiver circuit section, to the oscillating frequency (Fosc) of the control IC, is in the range of 15 to 35%.

* * * * *